Feb. 23, 1943. C. R. TAYLOR 2,311,709
APPARATUS FOR MAKING COATED CONFECTIONS
Filed Dec. 29, 1939 5 Sheets-Sheet 2
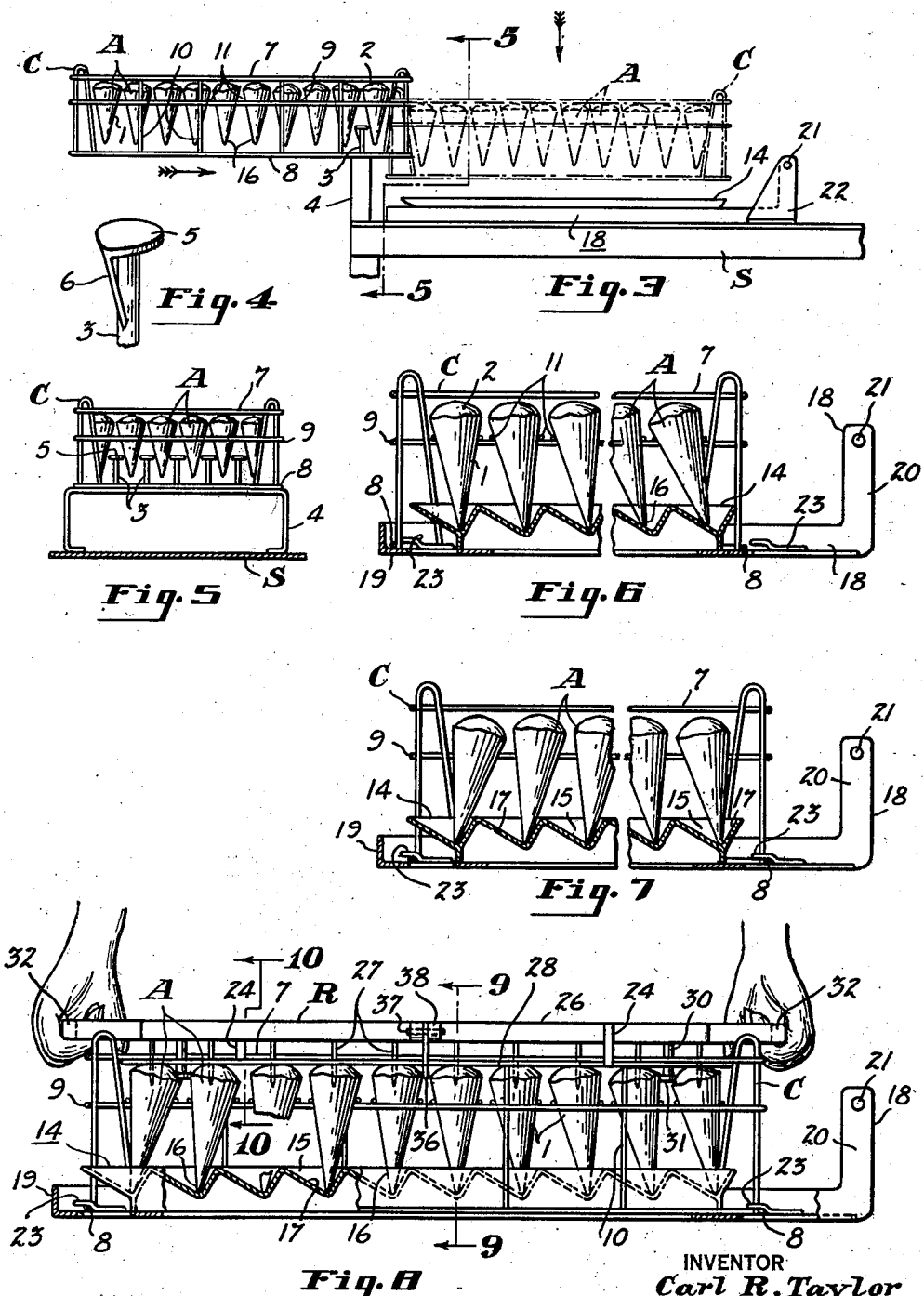
INVENTOR
Carl R. Taylor
BY
Evans + McCoy
ATTORNEYS

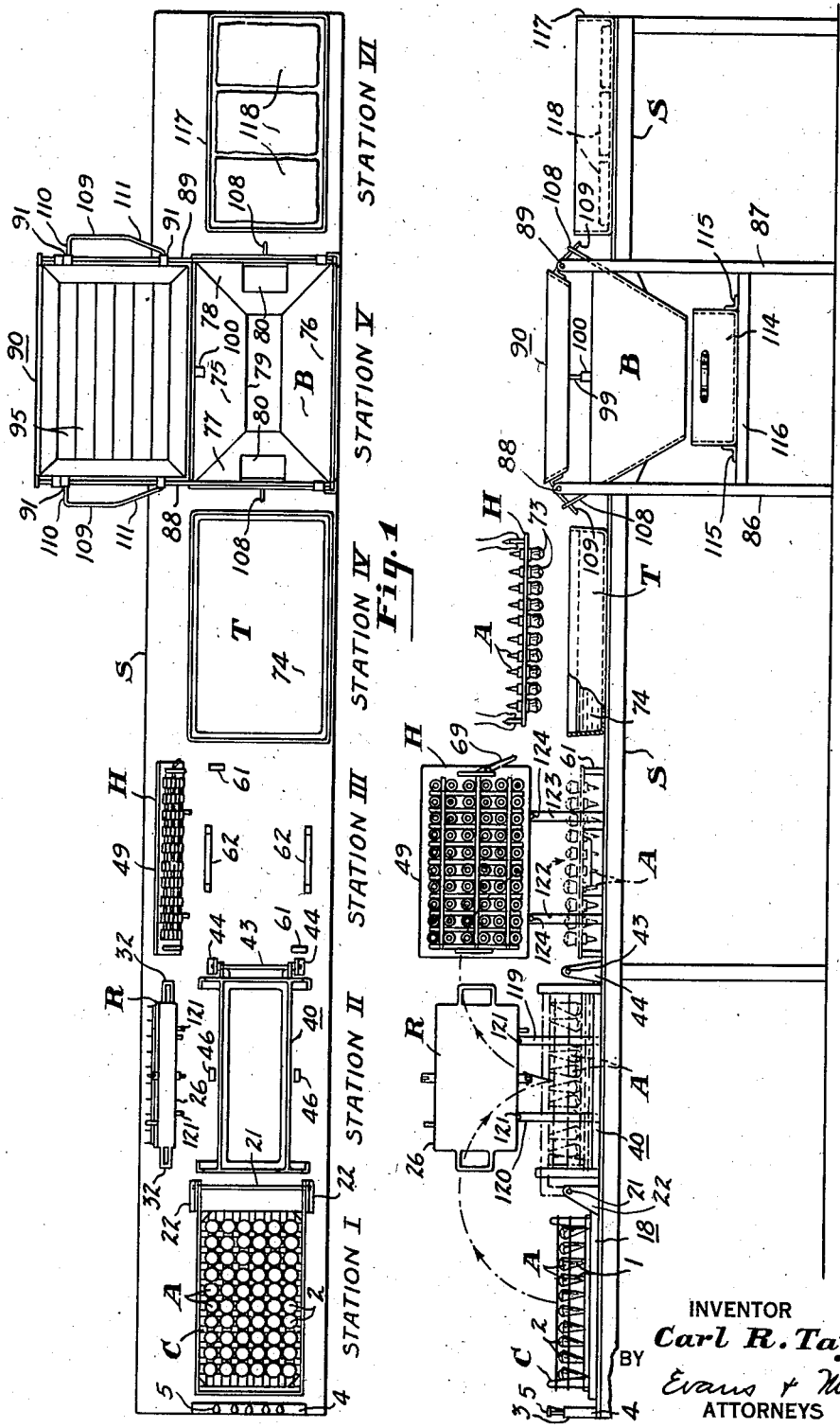

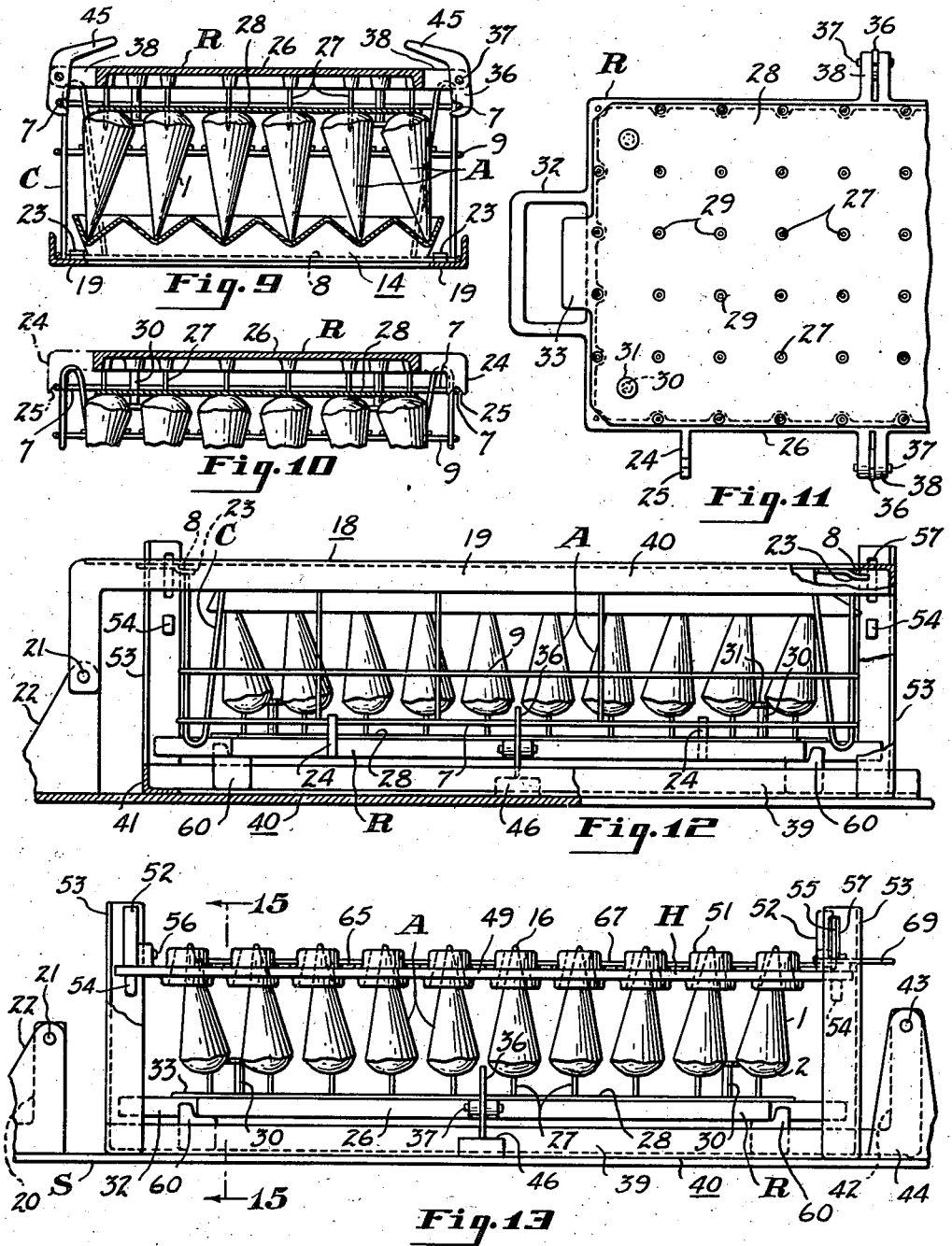

Feb. 23, 1943.  C. R. TAYLOR  2,311,709
APPARATUS FOR MAKING COATED CONFECTIONS
Filed Dec. 29, 1939  5 Sheets-Sheet 4
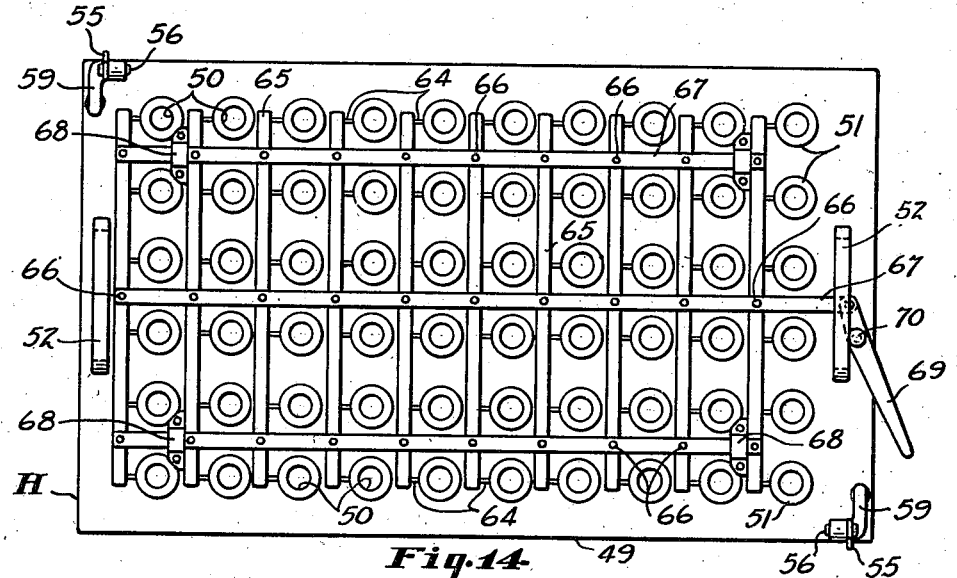
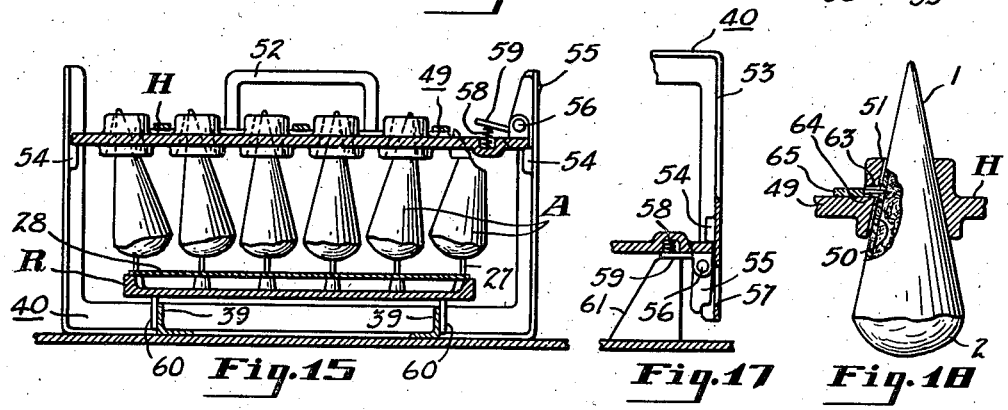
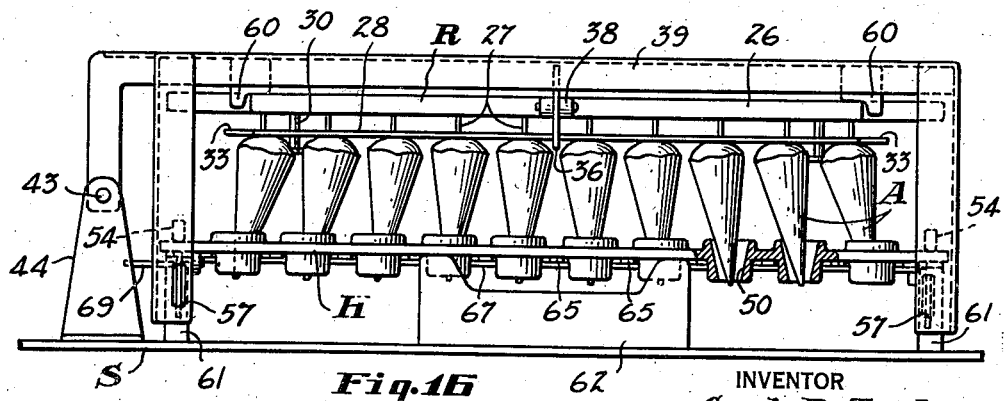
INVENTOR
Carl R. Taylor
BY
Evans + McCoy
ATTORNEYS Feb. 23, 1943.  C. R. TAYLOR  2,311,709
APPARATUS FOR MAKING COATED CONFECTIONS
Filed Dec. 29, 1939  5 Sheets-Sheet 5
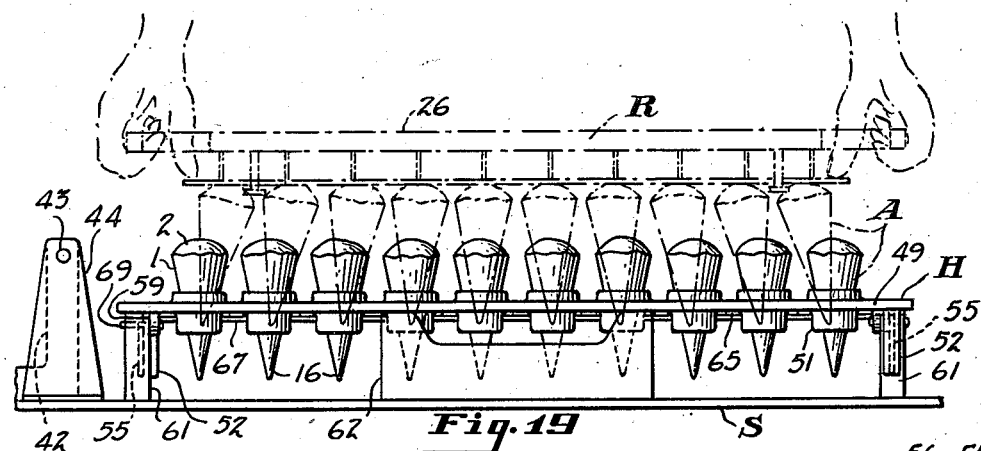
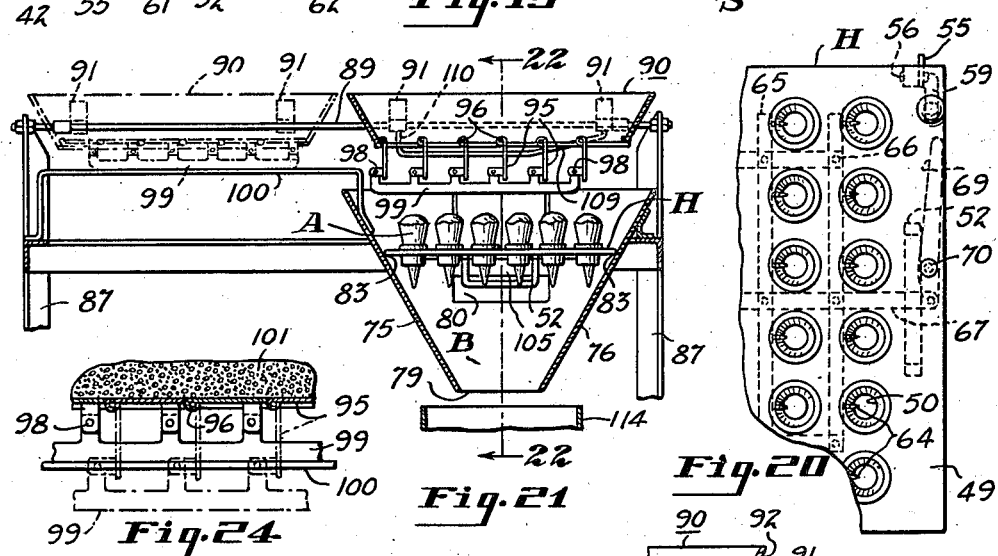
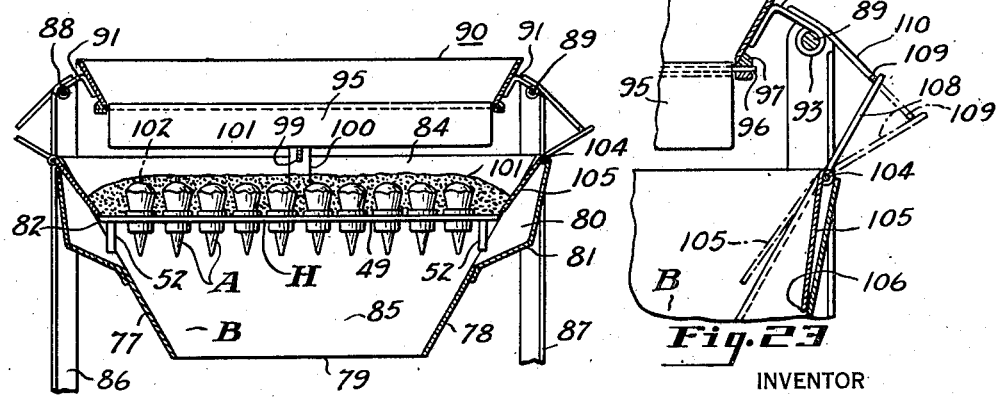
INVENTOR
Carl R. Taylor
BY Evans + McCoy
ATTORNEYS Patented Feb. 23, 1943

2,311,709

UNITED STATES PATENT OFFICE 2,311,709

APPARATUS FOR MAKING COATED CONFECTIONS

Carl R. Taylor, Cleveland Heights, Ohio, assignor to The Cream Cone Machine Company, Cleveland, Ohio, a corporation of Ohio Application December 29, 1939, Serial No. 311,555

15 Claims. (Cl. 214—1)

This invention relates to apparatus for making food articles like frozen confections, and more particularly to apparatus for producing chocolate nut coated frozen confections.

There are available numerous machines for making frozen confections and the like which operate on the principle of a continuous process. Such machines are of elaborate design and construction and consequently are very expensive. Makers of frozen confections who do not have a very large business cannot afford to invest in expensive machines for making their products. Furthermore, even large manufacturers of frozen confections do not wish to set up and operate large continuous process machines during slack business seasons because of the difficulty of cleaning and servicing such machines. However, to make a reasonable large number of frozen confections by hand is considered undesirable because of the increased labor cost. It is, therefore, an object of the present invention to provide a method of and apparatus for making frozen confections which may be economically operated on a large or small scale to produce confections in quantity with a minimum amount of labor.

Another object is to provide apparatus of the character mentioned which may be quickly and easily prepared for operation and which may be readily disassembled and cleaned so that it may be used to advantage for either relatively long or relatively short periods of time.

Another object is to provide apparatus for making frozen confection articles which minimizes the handling of the articles by the operator or operators so that the highest standards of cleanliness and sanitation may be maintained.

A further object of the invention is to provide apparatus for handling frozen confections which accommodates a multiplicity of such confections at once. More specifically, it is an aim of the invention to provide apparatus which receives a plurality of confections and successively passes the same through spreading, dipping, and coating stages in which the articles are successively separated from one another, covering at one end with a congealable liquid, and thereafter dusting or coating with comminuted food particles such as crushed nuts or cracker crumbs. In this connection it is to be observed that unique article or confection handling devices are incorporated in the apparatus and are devised to simultaneously hold a multiplicity of articles by their ends and in fixed relation with respect to one another.

A still further object of the invention is to provide a generally improved apparatus for making frozen confections, which apparatus is of relatively simple design and construction and inexpensive to manufacture and which may be assembled, operated, and disassembled with a minimum amount of relatively unskilled labor. Other objects and advantages inherent in the invention will become apparent as the following description of a suitable embodiment of the invention is made in connection with the accompanying drawings, in which:

Figure 1 is a plan view of the apparatus showing the same set-up in readiness for the manufacture of frozen confections;

Fig. 2 is a front elevational view of the apparatus showing a number of groups of frozen articles or confections in various stages of production;

Fig. 3 is an enlarged elevational view with parts removed showing the manner in which a carrier or basket of frozen confections is initially placed on the first rack or tiltable table of the apparatus;

Fig. 4 is a fragmentary detail in perspective showing one of the aligning elements which straighten the articles as the carrier is moved from the full line position to the broken line position of Fig. 3;

Fig. 5 is a transverse sectional view taken substantially on the line 5—5 of Fig. 3;

Fig. 6 is a longitudinal foreshortened sectional view showing the carrier or basket as the same is initially positioned on the first rack;

Fig. 7 is a view corresponding to Fig. 6, illustrating the interlocking of the carrier with the rack or tiltable table;

Fig. 8 is a longitudinal sectional view showing the carrier interlocked with the first rack and the retainer or impaling device positioned above the articles in the carrier;

Fig. 9 is a transverse sectional view with parts removed taken substantially on the line 9—9 of Fig. 8;

Fig. 10 is a fragmentary sectional detail taken substantially on the line 10—10 of Fig 8, showing spacing brackets or elements to position the retainer with respect to the carrier;

Fig. 11 is a fragmentary plan view of the underside of the retainer showing the stripper plate and the impalers;

Fig. 12 is an elevational view partly in section showing the first rack and the carrier inverted so that the articles are supported on the retaining device or impeller, which in turn is received in the second rack or tiltable table;

Fig. 13 is a view similar to Fig. 12, with the first rack and carrier pivoted to their original position and the article holder received on the upwardly directed ends of the articles or confections;

Fig. 14 is a plan view of the holder showing the mechanism for securing the articles or confections in the sockets of the holder;

Fig. 15 is a transverse sectional view with parts removed taken substantially on the line 15—15 of Fig. 13;

Fig. 16 is a longitudinal view showing the second rack or tiltable table pivoted to its inverted position so as to reverse the confections and return them to their upright attitude;

Fig. 17 is a fragmentary detail showing the release of the latch mechanism which normally locks the holder to the second rack when the apparatus is in the position shown in Fig. 16;

Fig. 18 is a fragmentary detail in section showing one of the retaining pins of the holder and the manner in which it locks a confection in the socket of the holder;

Fig. 19 is an elevational view of apparatus shown in Fig. 16 with the second rack pivoted to its original position and the confections released from the retainer or impaler;

Fig. 20 is a fragmentary detail showing the position of the pin actuating mechanism of the holder when the pins are projected into the sockets to lock the confections therein;

Fig. 21 is a transverse sectional view through the mechanism for dusting or covering the confections with comminuted food particles;

Fig. 22 is a sectional view with parts broken away, taken substantially on the line 22—22 of Fig. 21;

Fig. 23 is a fragmentary detail in section showing the pivoted wings for retaining the comminuted food particles on the holder carrying the confections and the mechanism for moving the wings into operative position; and Fig. 24 is a fragmentary detail in section showing the construction of the dump bottom in the hopper or bin which carries the comminuted food particles to a position above the confections in the receptacle or trough of the dusting or covering device.

A multiplicity of frozen confections or articles A are mounted in suitable baskets or carriers C and pass through the successive steps or stages in the process in groups. The frozen articles may be any well known confections, such, for example, as ice cream cones consisting of a conical shell 1 formed of baked or fried dough and formed into the shape of a cone. Within the cone there is received a quantity of solidified confection such as ice cream 2. In the preliminary stages of the manufacturing process and not forming an essential part of the present invention, the cones 1 are placed in the carriers or baskets C and then passed through a filling machine which deposits the ice cream 2 in a number of the cones in a single operation. The baskets or carriers C filled with the ice cream cones are preferably placed in a refrigerated compartment to freeze or solidify the ice cream and thereby prevent loss of the ice cream from the cone during subsequent steps of the process. One by one the baskets or carriers C are withdrawn from the refrigerated compartment (not shown) and passed over a straightening device, shown in Figs. 3 through 5. This straightener comprises a plurality of upright posts 3 which are secured to a bracket or pedestal 4 mounted at one end of table or supporting structure S which carries the apparatus. Each of the posts 3 is surmounted by a substantially circular or ovate cap member 5, the leading or forward edge of which is connected to a lower portion of the post 3 by a bar 6. As shown in Fig. 3, the carriers C comprise top and bottom wires 7 and 8 formed to rectangular shape and disposed in spaced parallel relation, and an intermediate wire or member 9 parallel to the top and bottom wires. Suitable vertical or connecting wires 10 secure the wires 7, 8 and 9 together, and spaced cross wires 11 are provided to engage and support the frozen articles A. These cross wires 11 may be secured to the intermediate wire or member 9.

In passing the carrier over the straightener it is positioned with the bottom member 8 resting on the bracket 4, so that the posts 3 are just inside one end portion of the bottom wire 8. The carrier is then advanced to the right from the full line position illustrated in Fig. 3, so that the portions 5 of the straighteners pass between adjacent articles A, as shown in Fig. 5, so as to align the articles in the carrier. The carrier is then lifted from the straightener and placed over a spreader 14 secured on the structure S adjacent the straightener.

The spreader may be formed of any suitable material such as sheet metal, or it may be cast or carved from wood or like material. It has a multiplicity of tapered sockets 15 formed in its upper surface. These sockets are equal in number to the cones or articles in the carrier and individually receive bottom or pointed ends 16 of the frozen confections. The spacing between the bottoms of the sockets or tapered formations 15 is greater than the normal spacing between the articles A in the carrier C, so that when the carrier is positioned over the spreader 14 the bottom or pointed ends 16 of the articles are spread apart by the tapered sides 17 of the sockets 15.

One of the functions of the spreader 14 is to move the bottom or pointed ends of the cones away from one another so as to increase the spacing of the articles, as will later appear. The spreader also positions the pointed ends in longitudinal and transverse rows so that the cone ends will be properly received within the sockets of the holder H when the latter is placed thereon, as will later be described. Although the sockets 15 are shown with straight sides and of generally pyramidal shape, they may have curved sides and be of generally conical shape.

In the figures the sockets 15 have been shown with one of the side walls 17 set at a greater angle with respect to the horizontal than the other, the more vertical portion of the socket wall being on the side thereof which is in a direction that the carrier or basket C is shifted to lock the bottom wire or member 8 under latch fingers 23 of a first tiltable table or rack 18, which normally rests on the supporting structure S adjacent the straightener and has angle shaped frame members 19 which extend around the spreader 14. At one end of the rack 18 angularly disposed extensions 20 are pivoted to a cross member or shaft 21 carried by spaced supports 22 secured to the supporting structure S. When the carrier C containing the straightened articles A is first positioned over the spreader 14 and on the rack 18, it is approximately in the position illustrated in Fig. 6 wherein the bottom member or wire 8 of the carrier rests on the inturned horizontally disposed flanges of the rack members 19. Upon shifting of the carrier to the right, as viewed in Figs. 2 and 6, the bottom member 8 of the carrier is received under latch fingers 23 secured to the rack 18, as shown in Fig. 7. This movement of the carrier causes the cones or articles A to rest in the bottoms of the sockets 15 and to bear against the bottom portions of the most vertical of the walls 17. As shown in Figs. 7 and 8, the pointed or small ends 16 of the cones are spread apart from one another in divergent fashion. While in this attitude a retaining device R is positioned over the carrier C and lowered into approximately the position shown in Fig. 8, the limit of movement being determined by spacing elements 24 secured to the retainer and having notched ends 25 which straddle and set upon the upper wire or member 7 of the carrier C.

The retainer may be formed of a suitable material such as metal and comprises a body member 26 which may be a casting of an aluminum alloy. This body member has secured thereto a multiplicity of pointed pins or impalers 27 which are arranged in spaced parallel relation to one another and extend perpendicularly from one side of the body member 26. These impalers may be formed of steel and can be secured to the body member by having the latter cast therearound, or the pins may be driven or threaded into apertures formed in the body member. A flat surfaced stripper plate or element 28 has a multiplicity of apertures 29 through which the pins 27 extend. Secured in the body 26 of the retainer are guide posts 30 on which the stripper 28 is slidably mounted for movement toward and away from the body 26. Enlarged heads 31 on the posts 30 limit the movement of the stripper. Handles 32 are formed on opposite ends of the body member of the retainer R and tabs or extensions 33 on the stripper plate 28 adjacent the handles enable the operator to press with his thumbs against the rear of the tabs or stripper 28 to force the latter against the tops of the frozen articles or ice cream cones carried by the pins 27, as will later appear.

The spacing of the pins 27 is substantially equal to the spacing of the cones or frozen articles in the carrier C, so that when the retainer is forced downwardly onto the tops of the articles as shown in Fig. 8, the ice cream 2 in each of the cones 1 is pierced by or receives one of the pins 27. The limit of movement of the retainer and pins with respect to the articles is determined by the spacing elements 24 which engage the top member or wire 7 of the carrier. When the spacing elements are seated on the top wire of the carrier, spring pressed latches 36 pivoted at 37 to extensions 38 of the body member 26 engage top wires or members 7 of the carrier to lock the retainer in position. In this manner the retainer R secures the articles A with their lower or pointed ends 16 in the spread-apart positions effected by the spreader 14, and the retainer R and carrier C interlocked by the latches 36 may be rotated or pivoted on the first rack 18 to which the carrier C is locked by means of the elements 23, to inverted or reversed position illustrated in Fig. 12 and shown by the broken lines at Station II of Fig. 2. The latch elements or fingers 23 are directed or arranged so that in pivoting the rack 18 from its normal position at Station I to its inverted position at Station II, the weight of the carrier and retainer prevents the carrier wire 8 from becoming dislodged from the fingers or elements 23.

At Station II the inverted retainer R is received by a second tiltable table or rack 40, which in its normal position rests upon the structure S directly beneath the inverted position of the first tiltable table or rack 18. The rack 40 is formed of side angle members 39 and end angle members 41 which correspond to the angle members 19 of the rack 18. All of these angle members may be formed of metal and secured to one another by any suitable means such as welding or riveting. Angular extensions 42 on the right hand ends of the side members 39, as viewed in Fig. 13, are pivoted at their upper ends to a cross bar or rod 43 carried by spaced brackets 44 secured to the supporting structure S.

The latches 36 have angularly disposed extensions 45 which engage release members or blocks 46 as the retainer R and carrier C reach the position shown in Fig. 12. The blocks 46 actuate the latches 36 to release the retainer R from the carrier C so that the latter, still interlocked with the first rack 18, may be pivoted away from the position shown in Fig. 12 to its normal position at Station I, leaving the frozen articles A impaled upon the pins 27 in inverted position. If desired, a supplementary spreader constructed like the spreader 14 previously described, but having sockets which are spaced further apart than the sockets 15 of the spreader 14, may be manually lowered onto the upturned bottom ends of the cones or articles as the latter are supported at Station II by the retainer pins 27. The supplementary spreader forces apart the ends 16 of the cones or articles so that they diverge from one another or are separated a greater amount than the separation effected by the first spreader 14. Also, the spreader 14 may be manually lowered onto the upturned ends 16 of the articles carried by the pins 27 of the retainer R at Station II to separate the article ends after the articles are inverted instead of lowering the articles into the spreader at Station I as previously described. After the rack 18 and carrier C have been pivoted away from Station II, the carrier may be disengaged from the rack and again filled with cones to be processed and the rack 18 is in position to receive the next succeeding carrier filled with frozen articles.

Holder H comprises a body member 49 having formed therein a multiplicity of spaced sockets 50, which are preferably of frusto conical or tapered form and have internal walls which are shaped to conform to the outside surface of the cones 1, as shown in Fig. 18. The body 49 of the holder H may be formed of wood, metal, or a suitable composition material. Preferably, it may be made by casting a light aluminum alloy to the desired shape. The sockets 50 may be formed in spaced bosses 51 which are integral with the body 49 and extend laterally from opposite sides thereof. At the ends of the holder H are handles 52, by means of which the holder may be grasped to place the same over the inverted articles A supported on the pins 27 of the retainer R, as shown in Fig. 13. In placing the holder over the upended articles, it is guided by upwardly extending angle members 53 secured to the members of the second tiltable table 40 and arranged to receive the corners of the body member 49. The angle guides 53 are disposed in parallel relation to one another with their interior angles directed inwardly so that their flanges engage the side and end edges of the holder body 49.

The spacing of the holder sockets 50 is preferably greater than the spacing of the cone bottom ends 16 (now uppermost because of the previous inverting of the cones). This is desirable even though the articles or cones are in the spaced or spread-apart attitude effected by the spreader 14 and the supplementary spreader. Thus, as the holder H is positioned as shown in Figs. 13 and 15, some of the cones or articles, particularly those outermost, may have their ends 16 slightly moved away or spread apart from the other articles. This second separating or spreading of the articles may be effected since the ice cream 2 will yield on the end pins sufficiently to allow the necessary displacement of the cones 1.

The downward movement of the holder H when being placed on the upended articles is limited by stops 54 secured in the angle of the upright members 53 of the rack 40. Accordingly, the holder H does not settle down on the articles or frozen cones A but is supported thereabout with the small ends only of the cones individually received in the separate sockets 50. As the holder H is seated on the stops 54, latches 55 pivoted to the body member 49 at 56 are engaged in recesses 57 formed in the supporting uprights 53. Helical compression springs 58 acting on angular extensions 59 of the latches 55 force the latter into recesses 57 when the holder is properly positioned over the upended cones or frozen articles.

The second tiltable table or rack 40 is then pivoted or rotated from station II, as shown in Fig. 13, to station III, as shown in Fig. 16. In this shifting or inverting of the second rack 40, the retainer R and holder H securing the articles A are carried along as a unit, the retainer R being engaged by the angle members 39 of the rack 40. This movement of the rack with the retainer and holder positions the articles A in their normal upright attitude with their smaller pointed ends 16 positioned within the sockets 50 of the holder H. During the pivoting movement the retainer R is engaged at the ends or otherwise by portions or lugs 60 of the rack 40 to prevent lateral or endwise shifting so as to retain the articles A in substantially a fixed position with respect to the holder H.

As the rack 40 carrying the holder and retainer with the cones is received at station III, supporting blocks or members 61 engage the extensions 59 of the latches 55 to pivot the same out of the recesses 57 and release the holder H from the rack 40 (see Fig. 17). The rack may now be pivoted back to station II in readiness to receive the next batch or group of articles.

Movement of the rack 40 back to station II leaves the holder H at station III with the frozen articles supported thereby and with the pins 27 of the retainer R still embedded in the ice cream 2. The operator then grasps the retainer, as shown by the broken lines of Fig. 19, and by pressing downwardly on the tabs 33 of the stripper 28, releases the articles A from the pins 27 so that the articles can settle or move downwardly into the sockets 50 under the influence of gravity. As previously mentioned, the spacing of the sockets 50 is greater than that of the small ends 16 of the articles, even as the latter may have been spread or separated by the spreader 14. Accordingly, as the articles settle into sockets 50 they are separated from one another a materially greater distance than in the carrier C. As shown in Fig. 19, the holder H is supported a sufficient distance above the structure S by means of the latch releasing blocks 61 and supporting blocks 62 to permit the end 16 of the cones to project through the sockets 50.

In order to lock or secure the articles A in the sockets 50 of the holder H, each of the bosses 51 in which the sockets are formed is provided with an opening 63 in which is mounted a retaining element or pin 64 movable through the side wall of the socket so as to pierce the wall of an article or cone within the socket. The pins for the multiplicity of sockets in the holder are secured to movable cross bars 65 which are connected at 66 to longitudinal carrier bars 67 guided in elements 68 secured to one side of the body 49 of the holder. One of the members 67 has a lever 69 pivoted thereto and is in turn pivoted at 70 to the body member 49 adjacent one end of the latter. By reciprocation of the lever 69 the pin elements 64 may be projected into or retracted from the sockets 50 through the walls thereof so as to engage and release articles or cones as desired. During the placing of the holder over the upended cones or frozen articles in the manner illustrated in Figs. 13 and 15, and until after the articles have been released from the retainer, as shown in Fig. 19, the pins 64 are retracted from the sockets 50 as shown in Fig. 14. After the frozen articles have been released from the retainer R and have settled into the sockets 50, as indicated by the full lines of Fig. 14, the lever 69 is actuated to force the pins 64 into the sockets 50 so as to pierce the cones 1. In this manner the frozen articles or ice cream cones are locked in the holder and the latter can be picked up by the operator and inverted without the articles being released from the sockets, as indicated in Fig. 18. In the inverted position the holder H is positioned above a container or tank T at station IV and lowered so that large ends 73 of the articles or confections A are immersed in a bath or mixture 74 of congealable liquid contained in the tank T. The liquid 74 may be any desirable coating material, such, for example, as chocolate sauce or similar type of syrup. This liquid adheres to the articles and coats the ends 73 thereof. The composition of the liquid is such that it congeals or solidifies at low temperatures and this action begins to take place as soon as the holder H is raised to withdraw the frozen articles from the liquid in the tank T. Immediately thereafter the holder is turned over to position the articles A, now coated with the congealable liquid or syrup, in upright attitudes and the holder is placed in the hopper or bin B at station V (see Figs. 21 and 22).

The bin B is formed with imperforate side walls 75 and 76 and end walls 77 and 78, all of which converge or slope downwardly toward one another, providing a relatively small opening 79 at the bottom of the bin. The side and end walls may be formed of suitable material, such as sheet metal or laminated wood, and the end walls are cut away to provide recesses 80 having walls 81. These recesses accommodate the handles 52 of the holder so that the holder has contact with the side and end walls of the bin, as indicated at 82 and 83, in this manner separating the interior space within the bin into an upper portion 84 above the holder H and a lower portion 85 below the holder.

The receptacle B is carried by a portion of the supporting structure S, having spaced uprights 86 and 87 at opposite ends of the receptacle. These uprights extend above the level of the tops of the receptacle walls and carry slide bars 88 and 89 in spaced parallel relation to one another.

As shown in Fig. 21, the slide bars extend rearwardly beyond the receptacle B and provide support for a bin 90. Extension brackets 91, preferably formed of metal, are secured to sloping side walls 92 of the bin 90 and extend laterally therefrom over the slide bars 88 and 89. End portions 93 of the extensions 91 embrace the slide bars to guide the movement of the bin.

A dump bottom is provided for the bin 90 and comprises a multiplicity of panels or slats 95 pivoted at their edges to spaced parallel rods 96 extending transversely across the bottom of the bin at right angles to the direction of reciprocation of the bin on the bars 88 and 89. The ends of the rods 96 may be rotatably received in journal members 97 secured along the bottom edges of the sloping side walls of the bin (Fig. 23).

The free ends of the slats 95 are provided with extensions pivoted at 98 to a common shoe 99 which is engageable with a track 100 carried by the supporting structure and the rear side wall 83 of the receptacle B. When the bin 90 is in the position illustrated by the broken lines of Fig. 21, the track 100 supports the shoe 99 in an elevated position which retains the shutters or panels 95 of the dump bottom in a common plane. Upon movement of the bin 90 to the right, as viewed in Fig. 21, the shoe 99 rides on the track 100 until the bin is positioned over the holder H and confections supported thereby in the receptacle B. When the shoe rides off the track 100, the support for the slats 95 of the dump bottom is released and the slats pivot downwardly to the spaced parallel position illustrated by the full lines, thus releasing comminuted food particles, such as crushed nuts 101 (Fig. 24) previously placed in the bin 90 to fall by gravity over the articles A coated with the liquid 74.

A sufficient quantity of the nuts 101 is placed in the bin 90 before the latter is drawn to releasing or dumping position over the coated articles in the receptacle B, so that the upper ends of the articles above the holder H are entirely buried or embedded in the mass of released nuts or other comminuted food particles (see Fig. 22), where the broken line 102 indicates the approximate level of the nuts in the receptacle B after their release from the bin 90.

Pivoted at 104 to the tops of the receptacle ends are wings or closure doors 105 which normally hang downwardly into the recesses 80 in the end walls 77 and 78. The doors 106 are of such size that the lower edges 106 thereof clear the end edges of the holder H, as shown in Fig. 22, when the doors are pivoted inwardly toward one another. In this manner the doors 105 are arranged to close the openings from the upper chamber 84 into the recess 80, thus preventing nuts or other food particles 101 from escaping through the recess 80 into the lower chamber or compartment 85 of the receptacle.

Arms or extensions 108 secured to the wings or doors 105 and extending upwardly therefrom are disposed when the doors are in their lowered position in the path of a curved track or guide 109 secured by extension 110 to the extension brackets 91 which support the bin 90 on the slide bars 88 and 89. Accordingly, when the bin 90 is moved from its retracted position, shown by the broken lines of Fig. 21, to its advanced or dumping position, shown by the full lines of that figure, the arms 108 are engaged by the tracks or guides 109 so as to pivot the wings or doors 105 from the normal full line position illustrated in Fig. 23 to the broken line position of that figure. In this manner the apparatus for covering the coated confections with comminuted food particles includes mechanism for closing off the upper portions of the receptacle chamber from the lower portion thereof to prevent the escape of the comminuted food particles therefrom. Preferably, the leading end of each of the guides or tracks 109 is formed to converge or extend inwardly, as indicated at 111 of Fig. 1, so that a gradual swinging movement is imparted to the doors 105 as the bin is advanced to dumping position.

After sufficient time has elapsed for the congealable liquid 74 on the upper ends of the articles A to become solidified while the article ends are embedded or surrounded by the mass of comminuted food particles 101, the bin 90 is pushed by the operator away from its position over the receptacle B to approximately the retracted position shown by the broken lines in Fig. 21. This movement of the bin causes the guides 109 to release the doors or wings 105 and expose the handles 52 or ends of the holder H so that the latter may be grasped by the operator and inverted while above the receptacle B to release such of the comminuted particles or nuts as have not adhered to the coated articles. The released food particles or nuts are discharged through the narrow opening 79 in the bottom of the receptacle into a scoop or hopper 114 supported by the guides 115 on cross members 116 carried by the uprights 86 and 87. After the holder H has been inverted over the receptacle B to release the unattached comminuted food particles, the completed frozen confections or articles A are released by shifting the lever 69 to withdraw the pins 64 from the cones 1. Thereafter the cones are wrapped or packaged as desired and are ready for sale and consumption.

The comminuted food particles or nuts received by the hopper 114 are placed in the bin 90 while the latter is in the retracted or receiving position shown by the broken lines of Fig. 21 and the full lines of Fig. 1, the panels or slats 95 having been moved to closed position by the shoe 99 and track 100. Comminuted food particles in sufficient quantity to make up for that adhering to the previous batch or group of coated articles is then added to the mass thereof in the bin 90 and the coating apparatus is ready for the next batch of articles to be treated.

If desired, a cooler 117 may be provided adjacent the receptacle B at station VI of the apparatus. This cooler can be mounted on the supporting structure S and comprises a tank or box suitably refrigerated by means of "dry ice" or solidified carbon dioxide 118. Instead of releasing the covered articles from the holder H immediately after being withdrawn from the receptacle B, the holder may be placed so that the edges thereof are supported on the side or end walls of the cooler box 117 with the coated and nut covered ends of the articles A extending downwardly into the interior of the box over the cooling means 118. In this manner the finished confections can be subjected to a cold atmosphere for a period of time after the nuts have been applied and before being packaged, so as to insure that the congealable liquid is thoroughly chilled before individual handling of the articles occurs. After the completed confections have been cooled in the refrigerator 117 they may be withdrawn therefrom as a group, secured in the holder H, and then released from the holder onto a table or receptacle in the packaging department of the establishment making the confections.

The arrangement of the several stations of the apparatus as shown in Figs. 1 and 2 has been found to be convenient and practical. However, other elements of the various devices utilized in carrying out the method of the present invention may be resorted to to suit the particular taste of the operator or operators utilizing the apparatus. Furthermore, several retainers R and holders H may be utilized depending upon the speed with which the successive groups of cones are to be advanced through the several stages of the process. It has been found convenient to provide uprights 119 and 120 mounted on the structure S and having lateral extensions 121 adjacent the second rack or tiltable table 40 at station II for supporting one of the retainers R when the latter is not in use as illustrated in Figs. 1 and 2. Also a mounting comprising uprights 122 and 123 having lateral extensions 124 may be provided adjacent station III for supporting one of the holders H when not in use.

The apparatus of the present invention may be utilized to advantage in producing numerous types of frozen confections and has been found particularly advantageous in coating the upper or large ends of ice cream cones with chocolate sauce and crushed nuts. A particular feature of the invention is the facility with which the apparatus may be employed in the manufacture of either a relatively small quantity of the food articles or a relatively large quantity. Because the apparatus is relatively inexpensive it may be made available to numerous manufacturers who must operate on a small scale and the apparatus, because of its simplicity, can be quickly and easily set up for operation and cleaned after a period of operation. Reference is made to my copending application, Serial No. 439,055 filed April 15, 1942, which covers subject matter disclosed but not claimed herein.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim is:

1. Apparatus for treating articles having top and bottom ends, comprising a rack for supporting the articles such as confections in upright position, means for simultaneously spreading the bottom ends of the articles while in the rack, means engageable with the top ends of the articles in the rack to secure the articles in fixed position relative to one another, means for holding the rack and securing means together so they may be simultaneously inverted to position the articles on the securing means with their bottom ends uppermost, holding means formed to simultaneously receive the bottom ends of all of the articles on the securing means, said holding means including means for individually engaging the received ends to retain the same in place.

2. Apparatus for making coated confections comprising a supporting structure, a rack pivoted on the structure, a basket for holding a multiplicity of confections, means for securing the basket and the rack together, retaining means having elements engageable with the individual confections in the basket to secure the same in fixed positions relative to one another, a second rack pivoted on the structure in position to receive the retaining means with the inverted confections, a holder having sockets to receive the upturned ends of the confections, and means for fastening the holder in fixed relation to the retaining means so that the retaining means and holder can be pivoted as a unit with the second rack to right the confections.

3. Confection making apparatus comprising a supporting structure providing a number of operating stations, a plurality of racks pivoted on the structure for movement between stations and including a pair of racks pivotable about different axes to superposed relation at a common station, portable devices each having means for retaining a plurality of confections, and means for attaching a plurality of the devices to one of the racks for movement therewith.

4. Confection making apparatus comprising a supporting structure providing a number of operating stations, a plurality of racks pivoted on the structure for movement between stations, a carrier for supporting a multiplicity of confections and attachable to a first of said racks at a first of the stations, a retainer having means individually engageable with confections in an attached carrier and being attachable to the carrier for pivotal movement with the same and with the rack to which the carrier is attached to a second of the stations, a second of said racks being disposed at said second station to receive the retainer and the carrier with the inverted confections held thereby and with the carrier uppermost, a holder having sockets receivable on the upturned ends of the inverted confections upon removal of the carrier and means for securing the holder in fixed position relative to the second rack and the retainer for pivotal movement to a third of the stations, and means at said third station to receive the holder with the confections in upright position to be received in the sockets upon release thereof by the retainer.

5. In confection making apparatus, a supporting structure providing a plurality of operating stations, a rack pivoted on the structure for movement between stations, a carrier for supporting a plurality of confections in upright positions, said carrier being of generally open construction so that supported confections project through the bottom thereof, means for attaching the carrier to the rack for pivotal movement therewith, and means at one of the stations for engaging projecting confections supported by the carrier to shift the confections to predetermined positions.

6. In confection making apparatus, in combination, a carrier having means for supporting a multiplicity of cone shaped articles in spaced relation to one another and with the pointed ends of the articles projecting from the carrier, and means movable relative to the carrier and having a multiplicity of tapered sockets for individually and simultaneously receiving the projecting ends of the supported articles and moving said ends simultaneously to predetermined positions relative to one another.

7. In confection making apparatus, in combination, a carrier having means for supporting a multiplicity of cone shaped articles in spaced relation to one another and with the pointed ends of the articles projecting from the carrier, means movable relative to the carrier and having a multiplicity of tapered sockets for individually and simultaneously receiving the projecting ends of the supported articles and moving said ends simultaneously to predetermined positions relative to one another, and means for guiding the relative movement of the carrier and the socketed means.

8. Confection handling apparatus comprising in combination a supporting structure providing a number of operation stations, a rack mounted for swinging movement on the structure between a first and a second station, a carrier having means for supporting a plurality of articles in spaced relation, means for fastening the carrier in predetermined position on the rack, a retainer having means engageable individually with the tops of articles supported in the carrier, latch means for connecting the retainer to the carrier so that the rack, carrier and retainer can be swung as a unit from the first station to the second station, and means at the second station for engaging the latch means and automatically releasing the connection between the retainer and the carrier whereby the retainer remains at said second station while the carrier and the rack can be swung as a unit to return to the first station.

9. Confection handling apparatus comprising in combination a rack and means mounting the same for swinging movement between operating stations, a retainer having means for individually engaging a plurality of articles and supporting the same in spaced relation to one another, means on the rack for receiving the retainer and holding the same in predetermined position relative thereto and with the ends of articles supported thereon directed upwardly, a holder having sockets for individually receiving said upwardly directed ends, means connecting the holder and the rack to secure the same together in predetermined relation so that the rack with the retainer and the holder can be swung as a unit from one station to another thereby inverting supported articles to position the same with said ends directed downwardly into said sockets of the holder, and means at said other station for actuating the connecting means to automatically release the holder from the rack.

10. Confection handling apparatus comprising a supporting structure providing a number of operating stations, a first rack mounted on the structure for swinging movement between a first and a second of said stations and second rack mounted on the structure for swinging movement between said second and a third of said stations, a portable retainer having means for individually engaging a plurality of articles and supporting the same in spaced relation to one another, latch means for releasably fastening the retainer to the first rack for movement therewith to the second station to be there received by the second rack, a portable holder having sockets for receiving the ends of articles supported by the received retainer, and means for releasably connecting the holder to the second rack for movement therewith to the third station.

11. Confection handling apparatus comprising a supporting structure providing a number of operating stations, a first rack mounted on the structure for swinging movement between a first and a second of said stations and second rack mounted on the structure for swinging movement between said second and a third of said stations, a portable retainer having means for individually engaging a plurality of articles and supporting the same in spaced relation to one another, latch means for releasably fastening the retainer to the first rack for movement therewith to the second station to be there received by the second rack, a portable holder having sockets for receiving the ends of articles supported by the received retainer, means for releasably connecting the holder to the second rack for movement therewith to the third station, and means at the second and third stations for respectively engaging and automatically releasing the latch means and the connecting means.

12. Confection handling apparatus comprising in combination a supporting structure providing a series of operating stations arranged in straight line relation, racks mounted on the structure for pivotal movement about spaced, substantially parallel and substantially horizontal axes located between the different stations and so that adjacent racks can be swung about their respective axes into superposed relation at a common station, portable devices each having means for individually receiving confections and supporting the received confections in spaced relation to one another, and means for attaching a plurality of the portable devices to one of said adjacent racks for swinging movement therewith.

13. Confection handling apparatus comprising in combination a supporting structure providing a series of operating stations arranged in straight line relation, racks mounted on the structure for pivotal movement about spaced, substantially parallel and substantially horizontal axes located between the different stations and so that adjacent racks can be swung about their respective axes into superposed relation at a common station, portable devices each having means for individually receiving confections and supporting the received confections in spaced relation to one another, means for attaching a plurality of the portable devices to one of said adjacent racks for swinging movement therewith to said common station, and means for attaching one of said plurality of portable devices to another of said adjacent racks for swinging movement therewith away from said common station.

14. Confection handling apparatus comprising in combination a supporting structure providing a series of operating stations arranged in straight line relation, racks mounted on the structure for pivotal movement about spaced, substantially parallel and substantially horizontal axes located between the different stations and so that adjacent racks can be swung about their respective axes into superposed relation at a common station, portable devices each having means for individually receiving confections and supporting the received confections in spaced relation to one another, means for attaching a pair of said portable devices to one of said adjacent racks for swinging movement therewith to said common station, and means for attaching another pair of said portable devices to another of said adjacent racks for swinging movement therewith away from said common station, said other pair including one of the portable devices of said first mentioned pair.

15. Confection handling apparatus comprising in combination a supporting structure providing operating stations, a rack pivotally mounted on the structure for swinging movement between different stations, a portable device having means for individually receiving a plurality of confections and retaining the confections in spaced relation to one another, means on the rack to engage and support the retaining device with received confections extending upwardly therefrom, a portable holder to be superimposed on the upwardly extending ends of confections received on the retaining device, said holder having a plurality of spaced sockets for individually receiving said confection ends, and means for readily and removably attaching the holder to the rack in predetermined relation thereto and in spaced overlying relation to the retaining device so that the rack with the retaining device and the holder can be swung as a unit between stations with the retaining device out of contact with the holder and with the confections disposed in the intervening space.

CARL R. TAYLOR.